(12) United States Patent
Atsumi et al.

(10) Patent No.: US 11,548,556 B2
(45) Date of Patent: *Jan. 10, 2023

(54) FRONT END STRUCTURE OF VEHICLE BODY

(71) Applicants: TOYOTA JIDOSHA KABUSHIKI KAISHA, Aichi-ken (JP); SUBARU CORPORATION, Tokyo (JP)

(72) Inventors: Hyuga Atsumi, Nagoya (JP); Shunsuke Takii, Aichi-ken (JP); Osamu Shimasaki, Nisshin (JP); Ryosuke Negawa, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 17/123,110

(22) Filed: Dec. 16, 2020

(65) Prior Publication Data

US 2021/0214010 A1 Jul. 15, 2021

(30) Foreign Application Priority Data

Jan. 14, 2020 (JP) .............................. JP2020-003616

(51) Int. Cl.
*B62D 21/11* (2006.01)
(52) U.S. Cl.
CPC .................................... *B62D 21/11* (2013.01)
(58) Field of Classification Search
CPC ...... B62D 21/11; B62D 25/145; B62D 21/02; B62D 21/152; B62D 21/155
See application file for complete search history.

(56) References Cited

U.S. PATENT DOCUMENTS

2006/0113784 A1* 6/2006 Kishima .............. B62D 21/155
296/203.02
2007/0262614 A1 11/2007 Asai
(Continued)

FOREIGN PATENT DOCUMENTS

CN 101022987 A 8/2007
JP 2004276698 A 10/2004
(Continued)

OTHER PUBLICATIONS

Office Action in U.S. Appl. No. 17/124,498, dated Apr. 20, 2022, 12pp.
(Continued)

*Primary Examiner* — Lori L Lyjak
(74) *Attorney, Agent, or Firm* — Hauptman Ham, LLP

(57) ABSTRACT

A front end structure of a vehicle body may include: a pair of left and right front side members each extending in a vehicle front-rear direction; a pair of left and right apron upper members each extending in the vehicle front-rear direction and being located outward of the pair of left and right front side members in the vehicle left-right direction; a pair of left and right connection members, the left connection member extending between an intermediate portion of the left front side member and the left apron upper member and the right connection member extending between an intermediate portion of the right front side member and the right apron upper member; and a component mount frame comprising a first mount crossmember extending between the pair of left and right connection members in the vehicle left-right direction.

8 Claims, 3 Drawing Sheets

(56) References Cited

U.S. PATENT DOCUMENTS

| | | | | |
|---|---|---|---|---|
| 2014/0183905 A1* | 7/2014 | Chikazawa | ............ | B62D 21/06 |
| | | | | 296/187.08 |
| 2014/0246880 A1* | 9/2014 | Barbat | ................. | B62D 21/152 |
| | | | | 296/203.02 |
| 2018/0265135 A1* | 9/2018 | Komiya | ................... | B60R 19/34 |
| 2018/0312198 A1* | 11/2018 | Shimizu | ................. | B62D 27/04 |
| 2018/0370571 A1* | 12/2018 | Sekiya | ................. | B62D 25/082 |
| 2019/0031011 A1* | 1/2019 | Fujiaki | .................... | B60K 5/04 |
| 2020/0047696 A1* | 2/2020 | Atsumi | ................... | B60R 19/18 |
| 2020/0076270 A1 | 3/2020 | Murai | | |
| 2020/0086926 A1* | 3/2020 | Hashida | ................. | B60K 11/04 |
| 2020/0102012 A1* | 4/2020 | Sakai | ....................... | B60G 3/06 |
| 2020/0283068 A1 | 9/2020 | Murai | | |

FOREIGN PATENT DOCUMENTS

| | | |
|---|---|---|
| JP | 201120628 A | 2/2011 |
| JP | 202032813 A | 3/2020 |
| JP | 2020142627 A | 9/2020 |

OTHER PUBLICATIONS

Office Action in U.S. Appl. No. 17/124,498, dated May 5, 2022, 12pp.

Advisory Action in U.S. Appl. No. 17/124,498, dated Sep. 8, 2022, 3pp.

Office Action in U.S. Appl. No. 17/124,498, dated Jul. 22, 2022, 11pp.

\* cited by examiner

FRONT END STRUCTURE OF VEHICLE BODY

CROSS-REFERENCE TO RELATED APPLICATION

This application claims priority to Japanese patent application No. 2020-003616, filed on Jan. 14, 2020, the entire contents of which are incorporated herein by reference.

TECHNICAL FIELD

The technique disclosed herein relates to a vehicle body, especially relates to a front end structure of a vehicle body.

BACKGROUND

A front end structure of a vehicle body is described in Japanese Patent Application Publication No. 2011-20628. This front end structure includes a pair of left and right front side members each extending in a vehicle front-rear direction and a pair of left and right apron upper members each extending in the vehicle front-rear direction, with the left apron upper member located outward of the left front side member and the right apron upper member located outward of the right front side member. A component mount frame on which components such as a power conversion unit are mounted is fixed to the pair of left and right front side members.

SUMMARY

An excellent safety performance against collision is needed for a front end structure of a vehicle body, and it is required to meet standards (safety standards) which should be met in a variety of collision tests. Among the tests, a Small Overlap (SOL) crash test is regarded as one of harshest collision tests with the vehicle body impacted with very severe damages. In the Small Overlap crash test, in particular, a collision load tends to be concentrated only on one of front upper members, as a result of which this front upper member is bent inward. In this case, collision energy cannot be sufficiently absorbed.

Given the above conditions, the present disclosure provides a novel and useful front end structure of a vehicle body. This front end structure may comprise: a pair of left and right front side members each extending in a vehicle front-rear direction; a pair of left and right apron upper members each extending in the vehicle front-rear direction, the left apron upper member being located outward of the left front side member in a vehicle left-right direction and the right apron upper member being located outward of the right front side member in the vehicle left-right direction; a pair of left and right connection members, the left connection member extending between an intermediate portion of the left front side member and the left apron upper member and the right connection member extending between an intermediate portion of the right front side member and the right apron upper member; and a component mount frame comprising a first mount crossmember extending between the pair of left and right connection members in the vehicle left-right direction.

In the above-described front end structure of the vehicle body, the left apron upper member is connected to the left front side member positioned inward thereof in the vehicle left-right direction via the left connection member on a left side of the vehicle, and the right apron upper member is connected to the right front side member positioned inward thereof in the vehicle left-right direction via the right connection member on a right side of the vehicle. Further, the pair of left and right connection members is connected to each other via the first mount crossmember. With such a configuration, the left apron upper member is supported by the left front side member and the component mount frame via the left connection member from an inner side thereof in the vehicle left-right direction, and the right apron upper member is supported by the right front side member and the component mount frame via the right connection member from an inner side thereof in the vehicle left-right direction. Due to this, even when a collision load is concentrated only on one of the apron upper members, the apron upper members can be prevented from being bent inward, and more of collision energy can be absorbed.

DETAILED DESCRIPTION

Figure 1:
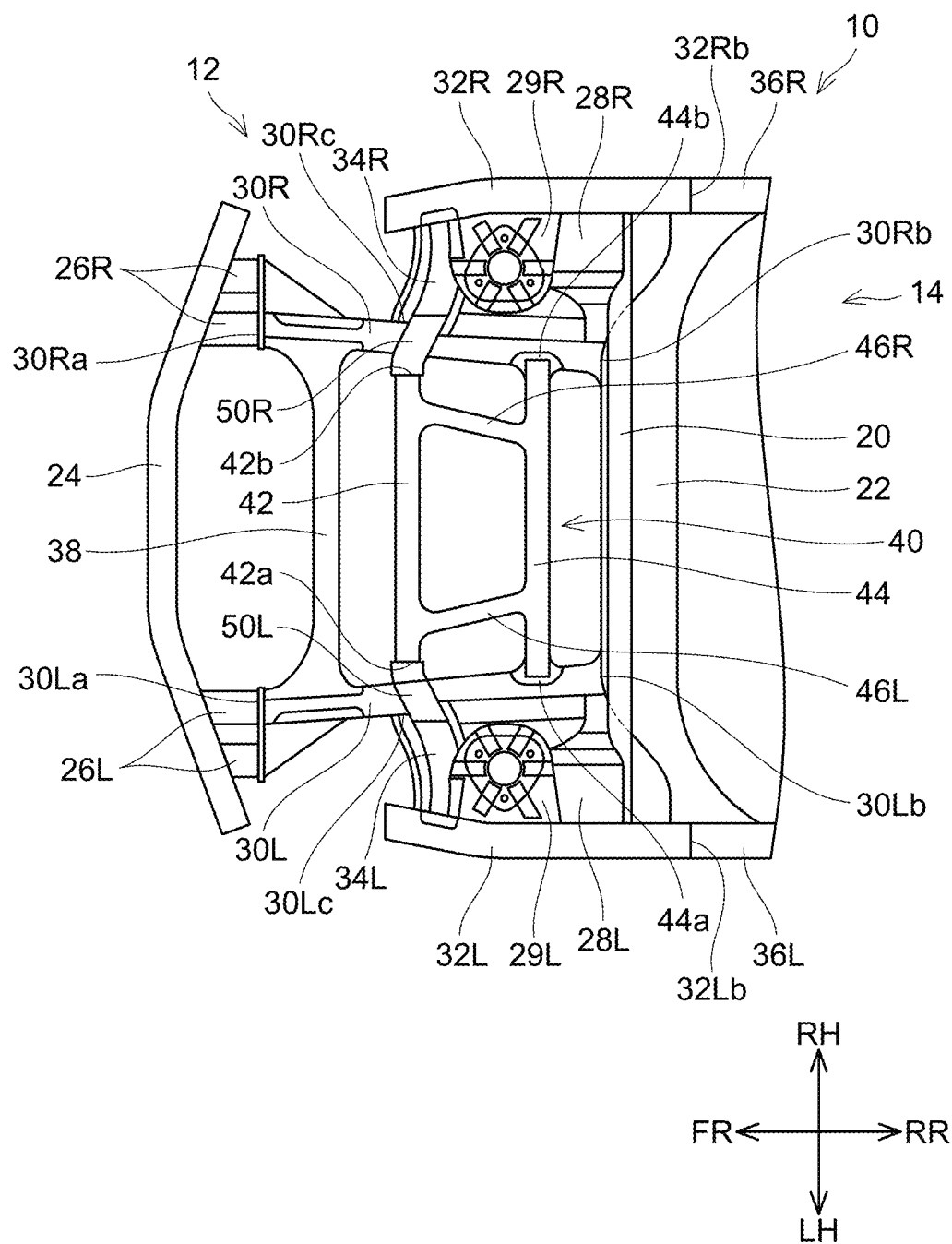
FIG. 1 shows a plan view of a front end structure 12 of a body 10 of an embodiment.

In an embodiment of the present art, the front end structure of the vehicle body may further comprise a pair of left and right suspension towers, the left suspension tower being disposed between the left front side member and the left apron upper member and the right suspension tower being disposed between the right front side member and the right apron upper member. In this case, the left connection member may be disposed along the left suspension tower, and the right connection member may be disposed along the right suspension tower. According to this configuration, strengths of the connection members can be significantly enhanced by the suspension towers having a non-flat shape. A part of or an entirety of each of the connection members may be integrally constituted with corresponding one of the suspension towers, or may constitute a part of corresponding one of the suspension towers.

In one embodiment of the present art, the front end structure of the vehicle body may further comprise a dash crossmember extending in the vehicle left-right direction and a pair of left and right front pillars (also referred to as A pillars) each extending in a vehicle up-down direction. In this case, rear ends of the left and right front side members may be connected to the dash crossmember. A rear end of the left apron upper member may be connected to the left front pillar, and a rear end of the right apron upper member may be connected to the right front pillar. Further, a lower end of the left front pillar may be connected to one end of the dash crossmember, and a lower end of the right front pillar may be connected to another end of the dash crossmember.

According to the aforementioned configuration, a ring structure including the left apron upper member, the left connection member, the left front side member, the dash crossmember, and the left front pillar is defined on a left side in a plan view, and a ring structure including the right apron upper member, the right connection member, the right front side member, the dash crossmember, and the right front pillar is defined on a right side in a plan view. As a result, rigidities and strengths of these members in the vehicle left-right direction can be significantly enhanced, by which the apron upper members can be effectively suppressed from being bent inward. The respective lower ends of the front pillars may at least partially be connected to the dash crossmember via a rocker (also referred to as a side sill).

In an embodiment of the present art, the component mount frame may further comprise a second mount crossmember located rearward of the first mount crossmember and extending in the vehicle left-right direction. In this case, one end of the second mount crossmember may be connected to the left front side member, and another end of the second mount crossmember may be connected to the right front side member. According to this configuration, the component mount frame can be stabilized, and the apron upper members can also be supported more stably by the component mount frame.

In the aforementioned embodiment, the component mount frame may further comprise a pair of left and right mount side members each extending between the first mount crossmember and the second mount crossmember in the vehicle front-rear direction. According to this configuration, a strength of the component mount frame can be enhanced, and the apron upper members can also be supported more stably by the component mount frame.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved front end structures of vehicle bodies, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

A body 10 of an embodiment will be described with reference to drawings. The body 10 of the embodiment has a monocoque structure, and is assumed to be employed mainly to an electric vehicle. It should be noted that a structure to be described in the present embodiment is not limited to employment in a body of an electric vehicle, and may be employed to bodies of various vehicles. The electric vehicle described herein broadly refers to vehicles of which wheels are driven by an electric motor, and includes, for example, a rechargeable electric vehicle including a battery charged by an external power source, a fuel cell vehicle whose power source is a fuel cell, and a hybrid vehicle including an engine as well as an electric motor.

In the drawings, a direction FR shows a frontward direction in a vehicle front-rear direction, and a direction RR shows a rearward direction in the vehicle front-rear direction. A direction LH shows a leftward direction in a vehicle right-left direction, and a direction RH shows a rightward direction in the vehicle right-left direction. A direction UP shows an upward direction in a vehicle up-down direction, and a direction DW shows a downward direction in the vehicle up-down direction. In the present disclosure, the vehicle front-rear direction, the vehicle right-left direction, the vehicle up-down direction may simply be referred to as the front-rear direction, the right-left direction, and the up-down direction, respectively.

Figure 2:
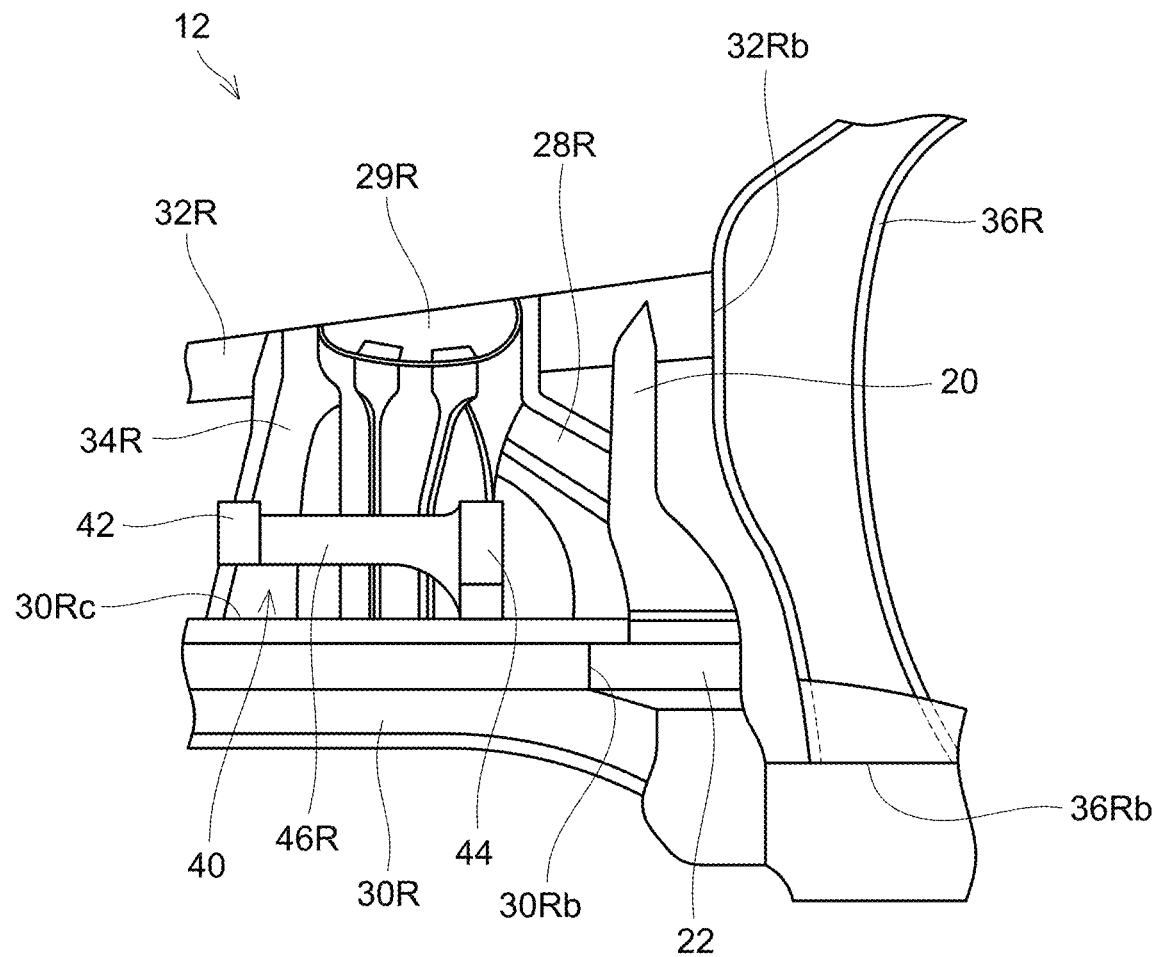
FIG. 2 shows a side view of a main section of the front end structure 12 of the body 10 of the embodiment.
Figure 2:
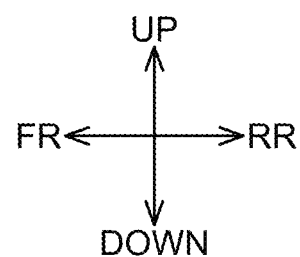
Figure 3:
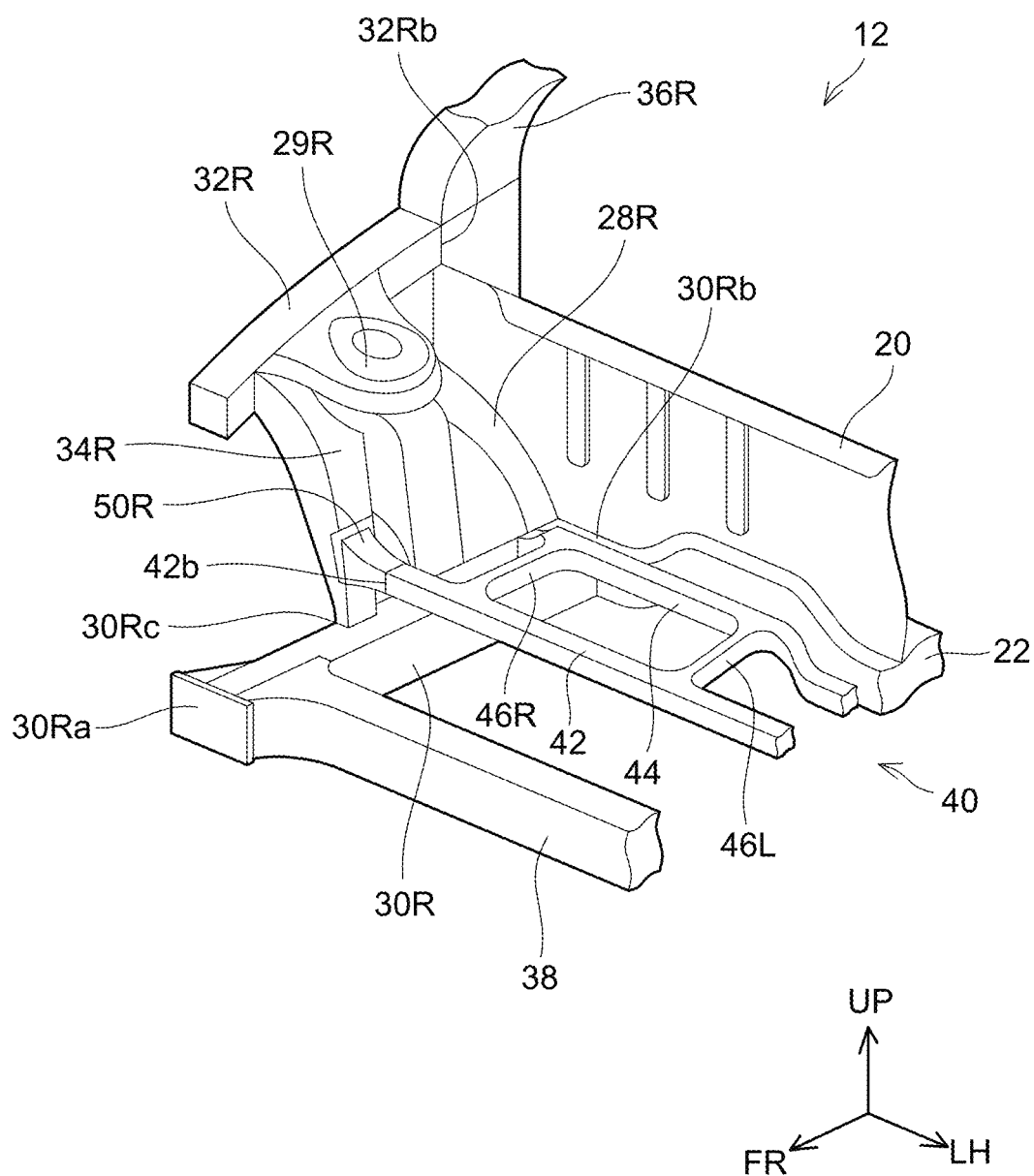
FIG. 3 shows a perspective view of the main section of the front end structure 12 of the body 10 of the embodiment.

As shown in FIGS. 1 to 3, a front end structure 12 of the body 10 includes a dash panel 20 and a dash crossmember 22. The dash panel 20 is positioned between the front end structure 12 of the body 10 and a cabin 14, and extends in the left-right direction and in the up-down direction. The dash crossmember 22 is a reinforcement member having one or more tubular structures, and extends in the left-right direction along the dash panel 20. A part of the dash crossmember 22 is positioned before the dash panel 20, and another part of the dash crossmember 22 is positioned behind the dash panel 20.

The front end structure 12 of the body 10 further includes a pair of left and right front side members 30L, 30R. Each of the front side members 30L, 30R extends in the front-rear direction. A rear end 30Lb of the front side member 30L and a rear end 30Rb of the front side member 30R are connected to the dash crossmember 22. A bumper reinforcement 24 is attached to a front end 30La of the front side member 30L via a crush box 26L and attached to a front end 30Ra of the front side member 30R via a crush boxes 26R. The front side members 30L, 30R are designed to absorb collision energy by being axially crushed upon frontal collision.

The front end structure 12 of the body 10 further comprises a front crossmember 38. The front crossmember 38 extends in the left-right direction between the front end 30La of the front side member 30L and the front end 30Ra of the front side member 30R. Although not particularly limited, in the present embodiment, each of the front side members 30L, 30R extends outward in the left-right direction toward the front side, and a distance between the front side members 30L, 30R also gradually broadens toward the front side.

The front end structure 12 of the body 10 further includes a pair of left and right fender apron panels 28L, 28R. Each of the fender apron panels 28L, 28L defines an inner wall of a wheel house that houses a wheel (not shown). The fender apron panels 28L extends upward and outward from the front side member 30L in the left-right direction, and the fender apron panels 28R extends upward and outward from the front side member 30R in the left-right direction. A suspension tower 29L is disposed on the fender apron panel 28L, and a suspension tower 29R is disposed on the fender apron panel 28R. Each of the suspension towers 29L, 29R protrudes inward in the left-right direction from the corresponding fender apron panel 28L, 28R, and defines a space for accepting a suspension of the wheel on its outer side.

The front end structure 12 of the body 10 further comprises a pair of left and right apron upper members 32L, 32R. Each of the apron upper members 32L, 32R is a reinforcement member having one or more tubular structures, and extends in the front-rear direction along an upper edge of the corresponding fender apron panel 28L, 28R. The apron upper member 32 L is located outward and upward relative to the front side member 30L in the left-right direction, and the apron upper member 32R is located outward and upward relative to the front side member 30R in the left-right direction. A rear end 32Lb of the apron upper member 32L is connected to a left front pillar 36L, and a rear end 32Rb of the apron upper member 32R is connected to a front pillar 36R. Each of the front pillars 36L, 36R substantially extends in the up-down direction, and a lower end 36Lb of the front pillar 36L and a lower end 36Rb of the front pillar 36R are directly or indirectly connected to the dash crossmember 22 (for example, via a rocker or a side sill).

The front end structure 12 of the body 10 further comprises a pair of left and right connection members 34L, 34R. The connection member 34L extends between an intermediate portion 30L of the front side member 30L and the apron upper member 32L, and the connection member 34R extends between an intermediate portion 30Rc of the front side member 30R and the apron upper member 32R. As described above, the apron upper member 32L is positioned outward and upward relative to the front side member 30L in the left-right direction, and the apron upper member 32R is positioned outward and upward relative to the front side member 30R in the left-right direction. As such, the connection member 34L extends outward and upward from the front side member 30L to the apron upper member 32L in the left-right direction, and the connection member 34R extends outward and upward from the front side member 30R to the apron upper member 32R in the left-right direction. Although not particularly limited, in the present embodiment, the connection member 34L is disposed along the fender apron panel 28L, especially along the suspension tower 29L, and the connection member 34R is disposed along the fender apron pane 28R, especially along the suspension tower 29R. The connection member 34L solely or with the fender apron panel 28L defines a tubular structure, and the connection member 34R solely or with the fender apron panel 28R defines a tubular structure.

The front end 12 of the body 10 further comprises a component mount frame 40. One or more components, such as a power conversion unit, are mounted on the component mount frame 40. The component mount frame 40 comprises a first mount crossmember 42, a second mount crossmember 44, and a pair of left and right mount side members 46L, 46R. The first mount crossmember 42 extends between the pair of left and the right connection members 34L, 34R in the left-right direction, and connects the pair of left and right connection members 34L, 34R to each other. Although not particularly limited, an end 42a of the first mount crossmember 42 is connected to an intermediate portion of the left connection member 34L via a left mount bracket 50L. Another end 42b of the first mount crossmember 42 is connected to an intermediate portion of the right connection member 34R via a right mount bracket 50R.

The second mount crossmember 44 extends in the left-right direction behind the first mount crossmember 42. An end 44a of the second mount crossmember 44 is connected to the left front side member 30L, and another end 44b of the second mount crossmember 44 is connected to the right front side member 30R. The first mount crossmember 42 and the second mount crossmember 44 are connected to each other by the pair of left and right mount side members 46L, 46R. Each of the mount side members 46L, 46R extends from the first mount crossmember 42 to the second mount crossmember 44 in the front-rear direction. A specific configuration of the component mount frame 40 is not particularly limited. However, the component mount frame 40 may comprise at least the first mount crossmember 42 extending between the pair of the connection members 34L, 34R in the left-right direction.

As described above, in the front end structure 12 of the body 10 of the present embodiment, the apron upper member 32L is connected to the front side member 30L positioned inward thereof in the left-right direction via the connection member 34L on the left side of the vehicle, and the apron upper member 32R is connected to the front side member 30R positioned inward thereof in the left-right direction via the connection member 34R on the right side of the vehicle. Further, the pair of connection members 34L, 34R is connected to each other via the first mount crossmember 42 of the component mount frame 40. With such a configuration, the apron upper member 32L is supported from the inner side thereof by the front side member 30L and the component mount frame 40 via the connection member 34L, and the apron upper member 32R is supported from the inner side thereof by the front side member 30R and the component mount frame 40 via the connection member 34R. Due to this, even when a collision load is concentrated only on one of the apron upper members 32L, 32R such as in the Small Overlap crash test, the apron upper members 32L and 32R can each be prevented from being bent inward, and can absorb a greater amount of the collision energy.

In the present embodiment, the connection member 34L is disposed along the suspension tower 29L, and the connection member 34R is disposed along the suspension tower 29R. As described above, each of the suspension towers 29L, 29R protrudes inward from the corresponding fender apron panel 28L, 28R and has a non-flat shape, thus its rigidity and strength are relatively high. Accordingly, when the connection member 34L is disposed along the suspension tower 29L and the connection member 34R is disposed along the suspension tower 29R, rigidities and strengths of the connection members 34L, 34R can be significantly enhanced. A part of or an entirety of the connection member 34L may be integrally constituted with the suspension tower 29L, or may constitute a part of the suspension tower 29L, and a part of or an entirety of the connection member 34R may be integrally constituted with the suspension tower 29R, or may constitute a part of the suspension tower 29R.

Further, in the present embodiment, the rear end 30Lb of the front side member 30L and the rear end 30Rb of the front side member 30R are connected to the dash crossmember 22. Further, the rear end 32Lb of the apron upper member 32L is connected to the left front pillar 36L, and the rear end 32Rb of the apron upper member 32R is connected to the front pillar 36R. And, the lower end 36Lb of the left front pillar 36L is connected to one end of the dash crossmember 22, and the lower end 36Rb of the right front pillar 36R is connected to another end of the dash crossmember 22. According to the aforementioned configuration, a ring structure including the apron upper member 32L, the left connection member 34L, the left front side member 30L, the dash crossmember 22, and the left front pillar 36L is defined on the left side of the vehicle in a plan view, and a ring structure including the apron upper member 32R, the right connection member 34R, the right front side member 30R, the dash crossmember 22, and the right front pillar 36R is defined on the right side of the vehicle in the plan view (see FIG. 1). As a result, rigidities and strengths of these members in the left-right direction are significantly enhanced, by which the apron upper members 32L, 32R are effectively suppressed from being bent inward.

What is claimed is:

1. A front end structure of a vehicle body, comprising:
a pair of left and right front side members located separately from each other in a vehicle left-right direction and each extending in a vehicle front-rear direction, the vehicle front-rear direction being perpendicular to the vehicle left-right direction;
a pair of left and right apron upper members each extending in the vehicle front-rear direction, the left apron upper member being located outward of the left front side member in the vehicle left-right direction and the right apron upper member being located outward of the right front side member in the vehicle left-right direction;
a pair of left and right connection members, the left connection member extending between an intermediate portion of the left front side member and the left apron upper member and the right connection member extending between an intermediate portion of the right front side member and the right apron upper member; and
a component mount frame comprising a first mount crossmember extending between the pair of left and right connection members in the vehicle left-right direction.

2. The front end structure according to claim 1, further comprising a pair of left and right suspension towers, the left suspension tower being disposed between the left front side member and the left apron upper member and the right suspension tower being disposed between the right front side member and the right apron upper member,
wherein the left connection member is disposed along the left suspension tower and the right connection member is disposed along the right suspension tower.

3. The front end structure according to claim 2, further comprising:
a dash crossmember extending in the vehicle left-right direction; and
a pair of left and right front pillars each extending in a vehicle up-down direction,
wherein
rear ends of the left and right front side members are each connected to the dash crossmember,
a rear end of the left apron upper member is connected to the left front pillar,
a rear end of the right apron upper member is connected to the right front pillar,
a lower end of the left front pillar is connected to one end of the dash crossmember, and
a lower end of the right front pillar is connected to another end of the dash crossmember.

4. The front end structure according to claim 3, wherein the component mount frame further comprises a second mount crossmember located rearward of the first mount crossmember and extending in the vehicle left-right direction,
one end of the second mount crossmember is connected to the left front side member, and
another end of the second mount crossmember is connected to the right front side member.

5. The front end structure according to claim 4, wherein the component mount frame further comprises a pair of left and right mount side members each extending between the first mount crossmember and the second mount crossmember in the vehicle front-rear direction.

6. The front end structure according to claim 1, further comprising:
a dash crossmember extending in the vehicle left-right direction; and
a pair of left and right front pillars each extending in a vehicle up-down direction,
wherein
rear ends of the left and right front side members are each connected to the dash crossmember,
a rear end of the left apron upper member is connected to the left front pillar,
a rear end of the right apron upper member is connected to the right front pillar,
a lower end of the left front pillar is connected to one end of the dash crossmember, and
a lower end of the right front pillar is connected to another end of the dash crossmember.

7. The front end structure according to claim 1, wherein the component mount frame further comprises a second mount crossmember located rearward of the first mount crossmember and extending in the vehicle left-right direction,
one end of the second mount crossmember is connected to the left front side member, and
another end of the second mount crossmember is connected to the right front side member.

8. The front end structure according to claim 7, wherein the component mount frame further comprises a pair of left and right mount side members each extending between the first mount crossmember and the second mount crossmember in the vehicle front-rear direction.

* * * * *